(12) United States Patent
Botchway et al.

(10) Patent No.: US 7,525,088 B2
(45) Date of Patent: Apr. 28, 2009

(54) OPTICALLY CONTROLLABLE DEVICE

(75) Inventors: Stanley Walter Botchway, East Hagbourne (GB); Andrew David Ward, Andover (GB); Michael Towrie, Wantage (GB)

(73) Assignee: The Science and Technology Facilities Council, Oxfordshire (GB)

( * ) Notice: Subject to any disclaimer, the term of this patent is extended or adjusted under 35 U.S.C. 154(b) by 256 days.

(21) Appl. No.: 11/658,030

(22) PCT Filed: Jul. 25, 2005

(86) PCT No.: PCT/GB2005/002897

§ 371 (c)(1),
(2), (4) Date: Jan. 22, 2007

(87) PCT Pub. No.: WO2006/008550

PCT Pub. Date: Jan. 26, 2006

(65) Prior Publication Data

US 2007/0295920 A1  Dec. 27, 2007

(30) Foreign Application Priority Data

Jul. 23, 2004  (GB) .............................. 0416498.4

(51) Int. Cl.
*A61N 5/00* (2006.01)
(52) U.S. Cl. ...................................... 250/306
(58) Field of Classification Search ................. 250/306, 250/307; 73/105
See application file for complete search history.

(56) References Cited

U.S. PATENT DOCUMENTS

| 5,445,011 | A | 8/1995 | Ghislain et al. |
| 5,512,745 | A | 4/1996 | Finer et al. |
| 6,055,106 | A | 4/2000 | Grier et al. |
| 6,180,940 | B1 | 1/2001 | Galstian et al. |
| 6,624,940 | B1 | 9/2003 | Grier et al. |
| 6,626,546 | B2 | 9/2003 | Grier et al. |
| 6,677,566 | B2 | 1/2004 | Knebel et al. |
| 6,946,666 | B2 * | 9/2005 | Saito et al. ............... 250/492.2 |
| 2002/0181113 | A1 | 12/2002 | Grier et al. |
| 2003/0066956 | A1 | 4/2003 | Gruber et al. |
| 2003/0086175 | A1 | 5/2003 | Grier et al. |

FOREIGN PATENT DOCUMENTS

| EP | 0 880 078 A | 11/1998 |
| WO | WO-02/093202 A2 | 11/2002 |
| WO | WO-03/001178 A2 | 1/2003 |

OTHER PUBLICATIONS

Guilford et al., Analytical Biochemistry, Academic Press, San Diego, CA, vol. 326, No. 2, Mar. 15, 2004.
Visscher et al., IEEE Journal of Selected Topics in Quantum Electronics, IEEE Service Center, US, vol. 2, No. 4, Dec. 1, 1996.

\* cited by examiner

*Primary Examiner*—Kiet T Nguyen
(74) *Attorney, Agent, or Firm*—Birch, Stewart, Kolasch & Birch, LLP (57) ABSTRACT

A device for manipulation by a plurality of optical traps is disclosed. Connected trapping elements such as transparent beads are also connected to a tip, which is spaced from the trapping elements by a distance greater than the effective range of the optical trapping fields.

29 Claims, 9 Drawing Sheets

OPTICALLY CONTROLLABLE DEVICE

The present invention relates to a device whose position and orientation may be controlled optically, and apparatus for using one or more such devices for microscopic manipulation, analysis and so on. In particular, the invention relates to a device in the form of a probe or guide having micrometer dimensions that can be controlled with nanometer precision through the use of optical traps. The device is suitable for use in micro- and nano-based applications, including, but not limited to, scanning probe microscopy, molecular force measurement and micromanipulation.

In scanning force microscopy, a tip attached to a cantilever is brought into contact (or near-contact) with a sample. The tip and sample are then moved relative to one another and variations in the forces acting between the tip and sample and/or in the topography of the sample cause the cantilever to deflect. These deflections are detected and used to build an image of the sample surface. The force sensitivity of the microscope is determined by the spring constant or stiffness of the cantilever, which is ideally as soft as possible to achieve maximal deflection for a given force. Conventional cantilevers typically have a spring constant of between 1 and 0.1 $Nm^{-1}$, corresponding to a force sensitivity of between 10 pN and 100 nN.

In US 2003/0066956 micrometer and nanometer sized tools are described such as awls, screwdrivers and levers which are manipulated by optical traps. The tools generally consist of an optically trappable bead or tube which is shaped over part of its surface with a tool-head. This document does not contemplate the use of such tools in microscopy.

In U.S. Pat. No. 5,445,011, on the other hand, a scanning force microscope is described having a force sensitivity of around 1 pN. Rather than employing a tip attached to a cantilever, the microscope employs a free-floating probe that is held in position by optical traps. The stiffness of the optical traps ranges between $10^{-4}$ and $10^{-5}$ $Nm^{-1}$, which is some several orders of magnitude less than that of a conventional cantilever. Accordingly, the tip of the probe is able to sense forces as small as $10^{-12}/10^{-13}$ N.

In U.S. Pat. No. 5,445,011 the probe comprises a transparent, cylindrical body having a tip at one end, and is held in position by a pair of optical traps, one at each end of the cylindrical body. As the probe is scanned over the surface of the sample, deflection of the probe along its longitudinal axis (i.e. z-axis) is sensed by measuring the trapping beams in transmission, i.e. after they have passed through the probe and sample.

Whilst the scanning force microscope of U.S. Pat. No. 5,445,011 is capable of more sensitive force measurements than conventional cantilever-based microscope probes, the apparatus nevertheless suffers from several drawbacks. First, the probe must be transparent and is therefore incapable of many other forms of force measurement, e.g. magnetic force microscopy. Second, only displacement of the probe along the longitudinal axis can be measured. The probe is incapable of measuring, for example, torsional forces that may be acting on the probe or of probing three dimensional surfaces. Also, the arrangement of the probe risks exposure of the sample to radiation from the optical traps which, especially in the case of biological material, may cause damage and/or distortion of the biological sample surface arising from the gradient forces of the optical trapping beams.

There is therefore a need for a more versatile probe having sub-piconewton force sensitivity. In particular, there is a need for a probe in which movement of the tip can be sensed and controlled in directions other than the longitudinal axis. Additionally, there is also a need for a sub-piconewton probe capable of other forms of force microscopy in which transparent tips are unsuitable.

In micromanipulation, optical traps have been used to catch and hold small particles (micron size and smaller) for study. In particular, the use of optical traps has proven extremely useful in the study of biological samples suspended in solution, including viruses, bacteria, living cells and organelles. However, in some cases optical trapping is unsuitable for biological samples as the intensity of the trapping beam can cause irreversible heat damage.

Where a sample is held by optical traps and studied by scanning force microscopy, the trapping forces must naturally be higher than the forces applied by the scanning probe. Accordingly, very intense trapping beams are generally required for scanning force microscopy studies, which again can result in irreversible damage to trapped particles.

There is therefore an additional need for a guide capable of controlling and manipulating small particles without exposing them to potentially harmful radiation.

Accordingly, the invention provides a probe structure that may be manipulated using optical tweezers, and in particular a rigid, semi rigid or flexible structure controlled by two or more optical traps. The probe structure includes at least one tip, preferably such that the active part or end of the tip is spaced from the nearest trapping beam, during use, by at least twice the beam diameter so that sample or tip activity are not affected by a trapping beam.

The invention also provides apparatus comprising one or more of these structures, disposed in a sample space, and a trap control arranged to form optical traps in said sample space to manipulate the structures in three dimensions. A fast optical sensor is preferably provided to enable rapid feedback control of the optical traps in response to the detected positions of the structures.

The invention also provides an optically controllable device having a tip connected to a plurality of optically trappable elements, the optical trapping elements being spaced from the free end of the tip a distance greater than the effective range of the optical trapping fields. The device may be in the form of an optically controllable probe or guide.

In having a plurality of optically trappable elements, forces other than those acting along the longitudinal axis of the probe may be measured, such as torque. Additionally, in having trappable elements that are spaced from the tip a distance greater than the effective range of the optical trapping fields, the position and orientation of the tip may be optically controlled without requiring the tip to be transparent.

The trappable elements typically are transparent or semi-transparent beads preferably having spherical or elliptical shapes and an average diameter of between 10 nm and 10 µm.

There are preferably at least three trappable elements arranged such that pairings of the trappable elements define at least three non-parallel axes. As a result, movement of the tip in all directions, including rotation about its axis, may be controlled and sensed.

The optically controllable device may include one or more force receiving surfaces for receiving incident radiation such that the scattering forces of the incident radiation upon the heads impart a driving force on the device. The surfaces can therefore be used to increase the forces exerted by the device on a sample. Additionally, the surfaces can be used to reposition the device more quickly by driving the device in a desired direction.

Nanometre-scale objects cannot be accurately held within an optical trap due to the size of the focal spot of the trapping beam as well as thermal noise, e.g. Brownian motion. With the present invention, the tip and trapping elements are separate. Accordingly, a nanometer-scale tip may be accurately controlled and positioned through the use of optical traps, which act upon the micrometer-scaled elements. The optically controllable device is therefore capable of nanometer lateral resolution and sub-piconewton force resolution, making the device ideally suited for scanning probe microscopy and optical spectroscopy including, but not exclusively, near-field optical microscopy, atomic force microscopy, magnetic force microscopy, electrostatic force microscopy, (tip-enhanced) Raman spectroscopy and (tip-enhanced) fluorescence spectroscopy.

Owing to its size, the optically controllable device is also ideally suited as a guide for the control and manipulation of small particles. For example, as a guide the device may be used to hold a particle to a substrate, or a pair of guides may be used as tweezers to hold the particle in free space. Although the tip of the device is preferably needle-like for microscopy and spectroscopy applications, the tip may be shaped differently for specific applications. For example, the end of the tip may be shaped like common tools, e.g. hook-shaped for picking up a particle, chisel-shaped for cutting a particle, or ring-shaped for holding a spherical particle.

The device has other potential applications including, for example, the triggering of biological or chemical process in or on cell membranes by chemically or biologically coating the tip.

Embodiments of the present invention will now be described by way of example with reference to the accompanying drawings, in which:

FIGS. 1A and B illustrate schematically a first optically controllable probe in accordance with the present invention;

FIG. 2 illustrates schematically a second optically controllable probe in accordance with the present invention;

FIG. 3 illustrates a plan view of the second probe of FIG. 2;

The figures are generally not to scale and are intended to illustrate clearly the separate components of the probe of the present invention.

Figures 1A, 1B, 2, 3:
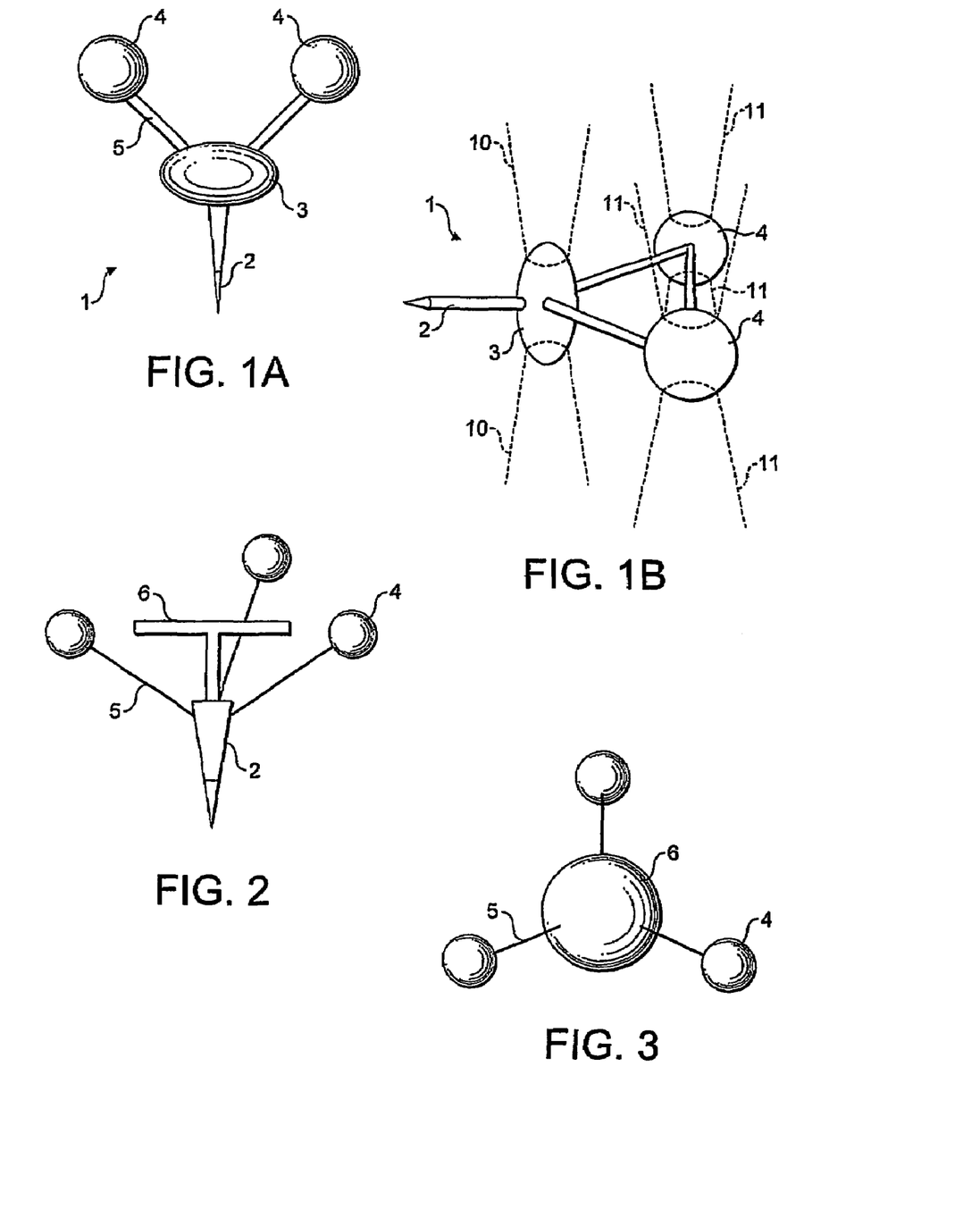

The probe 1 illustrated in FIG. 1A comprises a rigid or semi-rigid nanometer-scale tip 2 attached to a micrometer-scale structure of three beads 3,4. Each bead 3,4 is held in an optical trap using conventional trapping methods, such as that described in a paper by Guilford et al entitled "Creating Multiple Time-Shared Laser Traps with Simultaneous Displacement Detection Using Digital Signal Processing Hardware", Analytical Biochemistry 326, 153 (2004) by for example rapidly switching the beam of a single source between three positions or using multiple sources. The optical trapping fields are formed, geometrically, using a lens of high numerical aperture, and the trapping beam is typically about 0.5 to 5.0 µm across at the trapping region. Typical beam wavelengths are 300 to 2000 µm, and a typical average laser power for a single trap is 1 to 500 mWatts. Various spatial modes can be used for the trapping beam, but a $TEM_{00}$ mode, with a Gaussian profile, is usual. The positions and orientations of the beads 3,4, and consequently the tip 2, are adjusted by varying the positions and/or intensity distributions of the optical traps. Moreover, the strength of the optical traps can be controlled individually to enable a range of optical spring constants to be used in probing samples. FIG. 1B shows an arrangement similar to that of FIG. 1A in which the trapping laser beams passing through the beads 3,4 are represented by the lines 10 (in the case of bead 3) and 11 (in the case of beads 4). It will be seen that the size of the beam roughly matches the size of the respective bead.

The position of the beads 3,4 are optically monitored using sensors that are insensitive to the trapping beams. This may be achieved, for example, by backscattered laser light having a frequency different to that of the trapping beams or by optical transmission using, for example, white light. Improved spatial control and effective resolution may be obtained if signals from the sensors are used to detect the positions of the beads, and this positional information is used to move the optical trapping fields in order to reduce unwanted movement of the beads, as a feedback process.

The dimensions and materials used for the tip 2 are chosen according to the requirements of the probe 1, with a tip length of 1 to 100 µm being typical. In particular, the size and material of the tip 2 may reflect that employed in conventional force microscopy. For example, a silicon or silicon nitride tip of around 2 µm in length may be used for an AFM probe, whilst alloys such as CoCr, CoCrPt, FeNi and FeCoNi may be used for an MFM probe and a carbon nanotube for a STM probe. The end of the tip will typically have an effective diameter of about 1 to 1000 nm.

All or part of the tip 2 may be electrostatically charged for providing electrostatic force measurements. Alternatively, all or part of the tip 2 may be made of or coated in an electrically conductive material such that a voltage may be induced in the tip 2 by subjecting the tip 2 to an electromagnetic field. Similarly, all or part of the tip 2 may be made of or coated in metal, e.g. gold or silver, for tip-enhanced apertureless near field optical microscopy and spectroscopy, e.g. tip-enhanced Raman or fluorescence spectroscopy.

Suitable materials for the tip substrate include gold, silver, silicon, glass, crystal, carbon nanotube, plastics, proteins and soft materials. An active probe tip can be formed by coating an end region, or all of the tip with enzymes, fullerenes, catalysts, toxins, binders, drugs, ionic molecules, hydrophilic molecules and hydrophobic molecules. The tip shape may be determined by the required function, for example being elongated and scaled with a noble metal to maximise near field optical enhancement, or bifurcated for working with single molecules as illustrated below.

The beads 3,4 are made of a material transparent or semi-transparent to the trapping laser beams such that they can be optically trapped. Suitable materials include silica, polymers and rutiles. The refractive indices of the beads 3,4 must naturally be greater than that of the surrounding medium in order that the beads 3,4 may be optically trapped.

The number and shapes of the beads 3,4 may be tailored to suit the particular requirements of the probe 1. In the probes illustrated in FIGS. 1A and 1B, three beads 3,4 are employed, each pairing of beads forming a different axis so as to describe a 3-axis arrangement. Accordingly, movement of the tip 2 in all directions may be sensed by observing the change in relative positions of the beads 3,4. In particular, rotation of the tip 2 about its central axis brought about by torsional forces may be sensed.

The probe 1 of FIG. 1A has a central bead 3 directly attached to the tip 2 and two peripheral beads 4 indirectly attached to the tip 2 by connecting strands 5. The central bead 3 is elliptical in shape whilst the peripheral beads 4 are spherical. Different shaped beads are trapped in different ways according to the intensity distribution of the optical traps. For example, the elongated elliptical bead has improved stability in the axial direction. Other bead shapes, not necessarily elliptical, may be used to increase trapping stability in different directions. Stability is partly related to the shape of the focal volume of a trapping beam, which is generally elliptical, and the beads may be shaped to correspond to the intensity distributions of the optical traps. In the probe 1 of FIGS. 1A and 1B, both elliptical and spherical beads are shown by way of example. The central bead 3 in being elongated provides lateral stability whilst the two peripheral beads 4 provide rotational stability.

The beads 3, 4 typically have an average diameter of between tens of nanometers and tens of microns, again depending on the intended application, and is preferably around 1 micron, similar to typical optical trap dimensions. As can be clearly seen in FIG. 1B the distance of the free end of the tip 2 from the bead 3 and the diameter of the bead 3 have been selected so that the free end of the tip 2 of the probe is positioned outside of the effective range of the trapping beams, for example where the photon flux of the trapping beams is less than 20%, and more preferably less than 10% of the average flux experienced by the beads.

The strands 5 are preferably made of a rigid material such that any movement of the tip 2 is directly translated to the peripheral beads 4, and vice versa. However, for certain applications, as described below, flexible or elastic strands 5 may be required. The strands 5 are preferably thin (<0.1 μm) so as to minimise the total mass of the probe 1.

Whilst reference has thus far been made to optically trapping all beads 3,4, there may be situations for which trapping of all beads is not desired. For example, the peripheral beads 4 of the probe 1 of FIG. 1A may be free to move so as to monitor rotational movement of the tip 2.

A probe 1 having a single bead is limited in the force that it can impart. This is because the bead is damaged when the intensity of the trapping beam exceeds a particular threshold. In having a plurality of beads, the force imparted by the probe 1 can be linearly scaled. For example, a probe 1 having five beads is able to impart five times more force than a probe having a single bead.

The probe 1 may include one or more force receiving surfaces 6; as shown in FIGS. 2 and 3, to further increase the forces capable of being imparted by the probe 1. Unlike the beads 3,4, in which gradient forces overcome scattering forces, the surface 6 converts the scattering forces it is subjected to by an incident beam to a driving force in the direction of the incident beam which causes movement of the tip in that direction. Accordingly, the surface 6 preferably comprises a strongly absorbing (e.g. opaque) or reflective material.

The surfaces 6 are preferably disc-shaped and have a diameter corresponding to that of a well-focussed laser spot, e.g. between 0.3 and 10 μm. The disc-shaped surfaces 6 are preferably thin (e.g. <0.1 μm) so as to minimise the mass of the probe 1. In having disc-shaped surfaces 6, the target area-to-mass ratio is maximised, i.e. a large surface area can be made available to the incident radiation without unduly increasing the mass of the probe 1.

In the example of FIGS. 2 and 3, a laser beam may be directed upon either side of the force receiving surface 6 so as to impart an upward or downward force on the probe 1.

The surfaces 6 may be of use in constant-height force microscopy, whereupon the surfaces 6 can be used to restore the position of the tip 2 when the forces between a sample and tip 2 exceed the bead trapping forces. The surfaces 6 are also of particular use in aiding the movement of the probe 1 through the surrounding medium. When the probe 1 is repositioned, such as during scanning microscopy, the speed at which the probe can be repositioned depends, among other things, upon the viscosity of the medium and the restoring forces applied by the optical traps. There is a threshold in the restoring force that can be applied by an optical trap, beyond which a bead will escape. Consequently, the speed at which the optical traps and the probe 1 can be moved is limited. The surfaces 6 can therefore be used to increase the rate at which the probe 1 can be moved by driving the probe 1 in the direction of a beam incident upon a force receiving surface.

Although the force receiving surfaces 6 are preferably disc-shaped so as to maximise the target area-to-mass ratio, other shapes may nevertheless be employed. For example, a cube or sphere may be used such that scattering forces can be exerted in all directions through the use of a single force receiving surface 6.

Figure 4A:
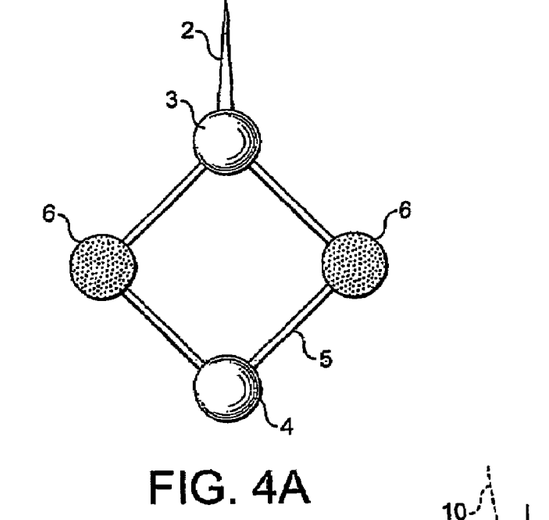
FIGS. 4A and 4B illustrate a third optically controllable device in plan and perspective view.
Figure 4B:
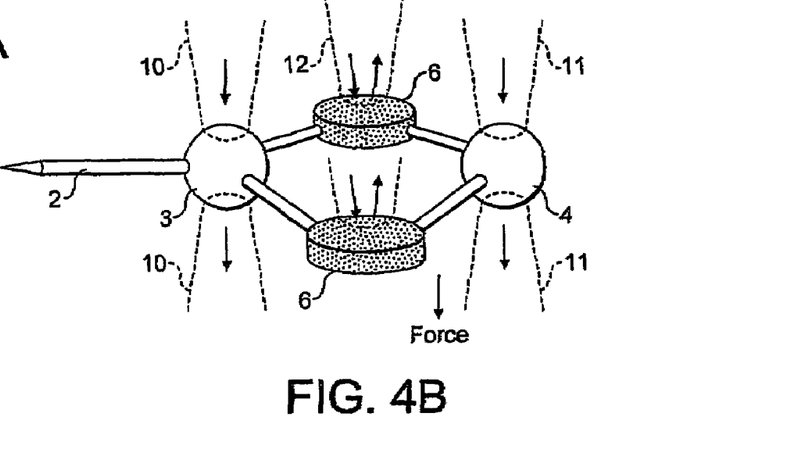

FIGS. 4A and 4B illustrate, in plan and perspective view, a similar example. In FIG. 4A, two transparent beads or vertices 3,4 form opposite corners of a quadrilateral. The other two opposite corners are formed by non-transparent vertices which are force receiving surfaces or disks 6. Tip 2 extends from one of the transparent vertices 3, and the four vertices are linked by strands 5.

In the perspective view of FIG. 4B it can be seen that the transparent vertices are manipulated by trapping beams 10, 11, whereas opaque vertices 6 are manipulated by light beams 12 which apply pressure depending on the photon flux and momentum of the beam incident on each force receiving surface 6. This pressure can therefore be conveniently controlled by varying the average intensity of each beam 12. The effect of the pressure is illustrated by an arrow labelled "FORCE".

Figure 5:
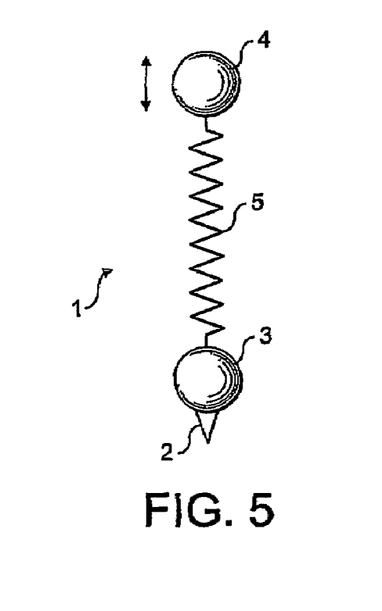
FIGS. 5 and 6 illustrate further optically controllable devices.

FIG. 5 illustrates an alternative embodiment of the present invention in which the tip 2 is attached directly to a first bead 3 which is in turn attached to a second bead 4 by an elastic strand 5. The strand 5 extends away from the tip 2 such that the tip 2, beads 3, 4 and strand 5 all lie substantially along the same axis. In use, only the second bead 4 is optically trapped and is subjected to an imparting force in the direction of the tip 2. This imparting force causes the tip 2 to oscillate, which is measured by monitoring the position of the first bead 3. As a result, studies may be made of how the oscillating tip 2 is influenced by a sample. Preferably, the first bead 3 is also optically trapped to provide improved control.

Rather than an elastic material, the strand 5 may comprise a thin strand of rigid material arranged in a zigzag or helical configuration.

Figure 6:
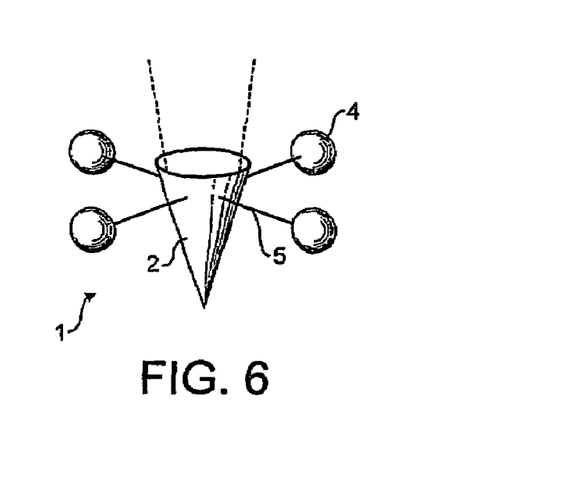

FIG. 6 illustrates a further embodiment of the present invention suitable for scanning near-field optical microscopy (SNOM). The tip 2 is of typical SNOM tip materials and dimensions, e.g. metal coated silica having an input aperture of around 1 micron and an output diameter of less than 100 nanometers. Four optically trappable beads 4 are attached to the tip 2 for positioning and orienting the tip 2. With the probe 1 of the present invention, there is no need for obtrusive optical fibres and the tip 2 may be accurately positioned in free-space. In use, the tip 2 is illuminated by laser light coupled to the input aperture and tip-induced light signals are collected in either transmission or apertureless mode. This particular design of probe is suitable for, among other things, shear-force surface morphology, Raman spectroscopy and fluorescence spectroscopy.

Figure 7:
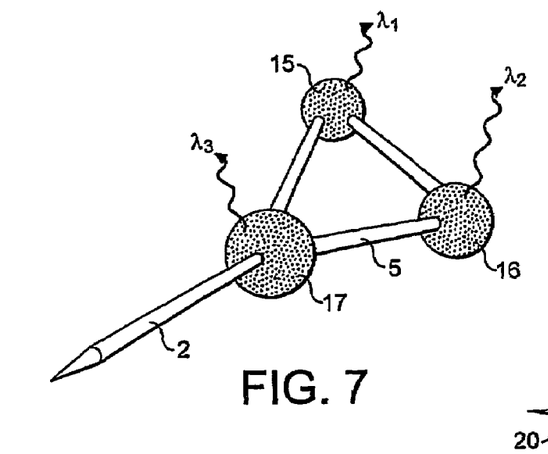
FIG. 7 illustrates an optically controllable device with fluorophore markers identifying the vertices.

Identification of parts of the probe may be aided by including structural or optical markers, such as by using coating or doping colourants or fluorphores. In FIG. 7 a probe structure is shown, in perspective, which includes three trappable vertex beads 15, 16, 17, with a tip 2 extending from one of the vertices. Each transparent vertex is labelled with a different fluorophore, so that vertexes 15, 16 and 17 emit radiation having characteristic wavelengths $\lambda_1$, $\lambda_2$ and $\lambda_3$ respectively. If, instead, colourants are used in the beads then each bead may be identified, for example at an optical position detector, by the respective effects on a light beam used to detect position.

Figure 8:
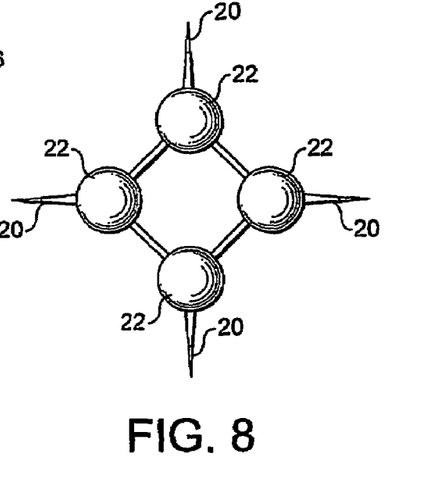
FIG. 8 illustrates an optically controllable device with multiple tips.

FIG. 8 illustrates, in plan view, a probe having multiple tips 20. In FIG. 8, each tip is attached to a separate one of four transparent vertex beads 22 arranged in a quadrilateral. Each tip may have a different structure, material makeup and/or function. Each tip may be identified by a corresponding colourant or fluorescent marker on the adjacent vertex bead. Each tip may be optimised for apertureless Near-field Scanning optical Microscopy (aNSOM), molecular manipulation, or force measurement.

Figure 9:
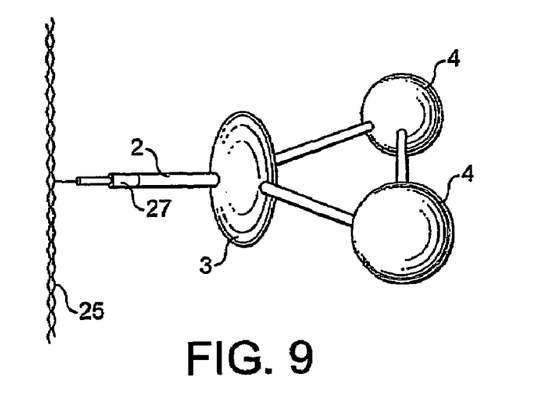
FIG. 9 illustrates use of an optically controllable device to study, manipulate or alter a single macromolecule.

FIG. 9 illustrates, in perspective view, a probe as described above in use to study a single macromolecule 25, which in this example is an extended molecule such as DNA or collagen. The end of the tip 2 is formed or coated with a noble metal tip to enable aNSOM and force probe capabilities.

The present invention has thus far been described with reference to scanning probe microscopy and optical spectroscopy. However, the optically controllable device 1 has many other potential uses, particularly as a guide in the field of micromanipulation.

Figure 10:
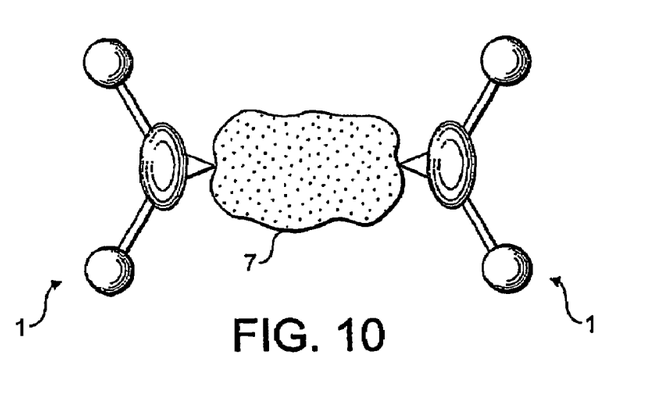
FIG. 10 illustrates optically controllable devices being used to guide a cell.

FIG. 10 illustrates a pair of guides 1 used as tweezers to hold a small particle 7 for study. This particular application is extremely useful in holding biological samples, such as cells and eggs, which would otherwise be damaged by optical trapping. When the guides are used in this manner, the ends of the tips 2 are generally blunt to prevent any potential damage occurring to the held particle.

The optically controllable device of the present invention has many other potential applications in micromanipulation. For example, a single guide 1 may be used to retain a particle against a substrate. A probe 1 having a sharp tip 2 can be used to puncture the wall of a particle. Additionally, a probe 1 similar to that illustrated in FIG. 6 may be used to accurately guide laser light to a sample surface for etching or cutting the sample.

The tip 2 of the optically controllable device 1 need not be needle-like as illustrated in FIGS. 1 to 9 but may instead be shaped differently for specific applications. For example, the end of the tip 2 may be hook- or cup-shaped for picking up a particle; it may be chisel- or spade-shaped for cutting a particle in two; it may be formed as a ring for holding a spherical particle etc.

The optically controllable device has many other potential applications. For example, the tip 2 of the probe 1 may be chemically or biologically coated to trigger functional processes in or on cell membranes and cell structures.

Figure 11:
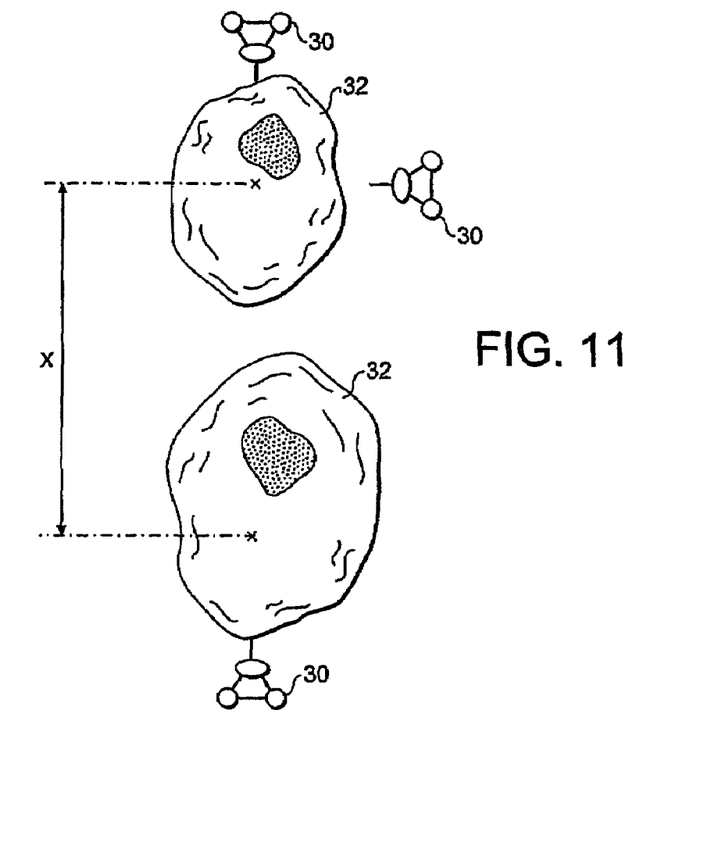
FIG. 11 illustrates study, or alteration of a cell by an optically controllable device.

FIG. 11 illustrates an application in which one or more probes 30 as described above are used to work with living cells 32, which are illustrated here as Mammalian cells 32 undergoing inter cell communication through nanoprobe induced interaction, with a variable separation distance x controlled using probes as described herein. The probe tip may be used for accurate placement of force, optical field intensity and molecular probes on the cell surface. The surface topography of the cell may be measured on the nanometer scale. Surface elasticity may be measured by relating force to surface deformation. The cell may be manipulated and positioned without being subject to the optical trapping fields. The probe tip may be coated with single or multiple molecules such as enzymes, drugs, toxins, binding molecules, molecular labels, fluorphores, DNA, RNA, and catalysts of various types. The tip may be used to penetrate the cell membrane, for example to insert or remove macromolecules and structures such as enzymes, RNA, DNA, viruses, drugs, toxins, binding molecules, molecular labels, fluorophores and catalysts.

Figure 12:
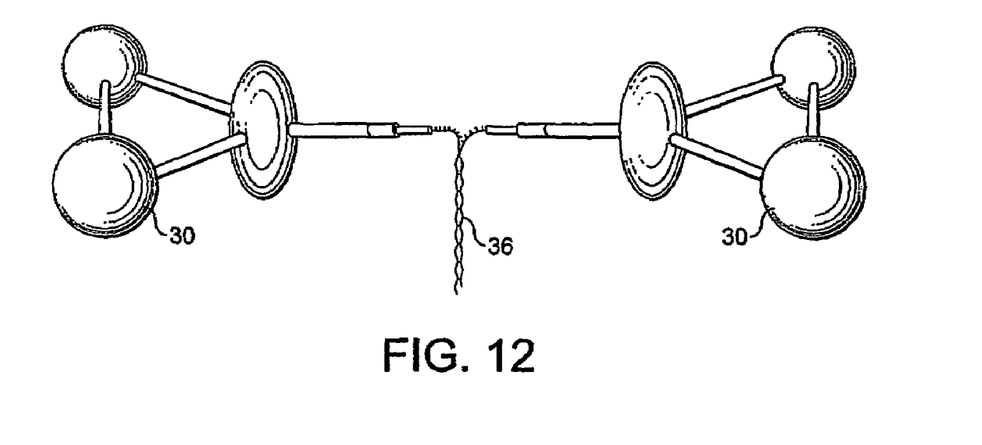
FIG. 12 illustrates separation of strands of a macromolecule.

FIG. 12 illustrates an application in which two probes 30 as discussed above are used to separate two strands of a macromolecule 36, in particular the unzipping of a DNA or RNA molecule. The fine tips of the probes permit small linker molecules to be used to attach to the macro-molecule, increasing sensitivity to force measurement, and the probe-tip structure allows the macromolecule to be located away from the potentially damaging trapping beams. By measuring the force required as the molecule separates, information about molecular structure and bonding strength can be acquired, including for example in the presence of enzymes and other influences.

Figure 13A:
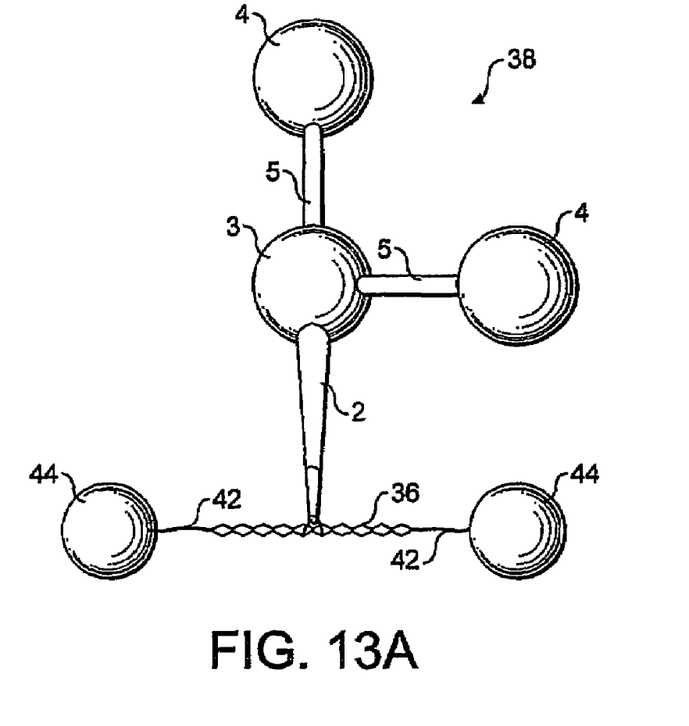
FIGS. 13A and 13B show examination of a macromolecule by a probe with a bifurcated tip.

FIG. 13A illustrates an application in which a macromolecule 36 is examined using probe 38, which is formed from a tip structure 2 attached to a first vertex bead 3, which is in turn attached to two further vertex beads 4. The end of the tip structure 2 and its relationship, in use, to the macromolecule 36, is illustrated enlarged in FIG. 13B. From this enlargement it can be seen that the tip structure 2 terminates in a forked structure 40, made of a noble metal such as gold, sized to comfortably accommodate the thickness of the macromolecule between the forks. The macromolecule is held in place for examination by linker molecules 42 attached to transparent beads 44, or probes as discussed, which are controlled using optical traps. Relative movement between the forked structure 40 and the accommodated macromolecule is achieved by suitable control of the various optical traps.

Figure 13B:
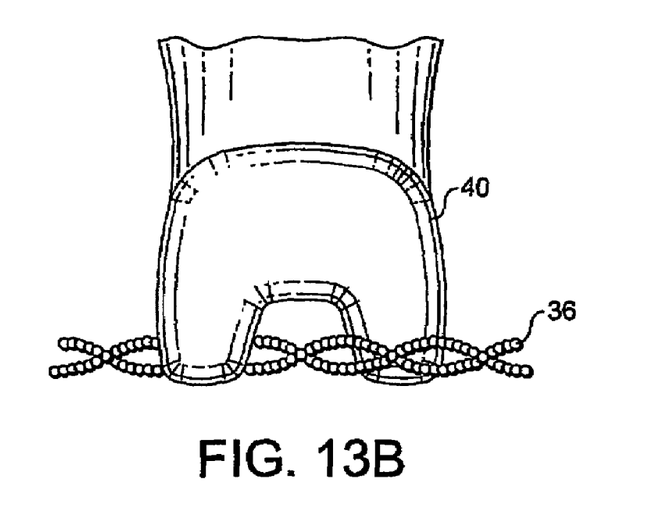

The arrangement of FIGS. 13A and 13B may be used for accurate force mapping of the macromolecule 36, to enable optical mapping of the macromolecule, to enable delivery of probe or active molecules, and so on. The tip, especially the forked structure 40, may be coated with one or more active molecules such as enzymes, drugs, toxins, binding molecules, molecular labels, fluorophores, DNA, RNA and catalysts.

The optically controllable device 1 may be manufactured using conventional micro-fabrication processes. For example, the tip 2, beads 4, strands 5 and surfaces 6 may be formed by etching a silicon substrate which is then oxidised to form transparent silica beads. A thin metal coating may then be deposited over the surfaces 6 and, if necessary, the tip 2.

Alternatively, the device 1 may be manufactured by lithographically patterning a photocurable transparent or semi-transparent polymer.

With the optically controllable device of the present invention, optical traps can be used to accurately position and orient a tip providing nanometer lateral resolution and sub-piconewton force resolution. In employing a plurality of beads, movement of the tip in all directions, including rotation about its axis, may be controlled and sensed. Additionally, the force of a single optical trap can be scaled such that relatively large forces can be exerted by the probe.

A variety of tip designs may be used making the optically controllable device suitable for many different applications including, but not limited to, scanning probe microscopy and micromanipulation.

Figure 14:
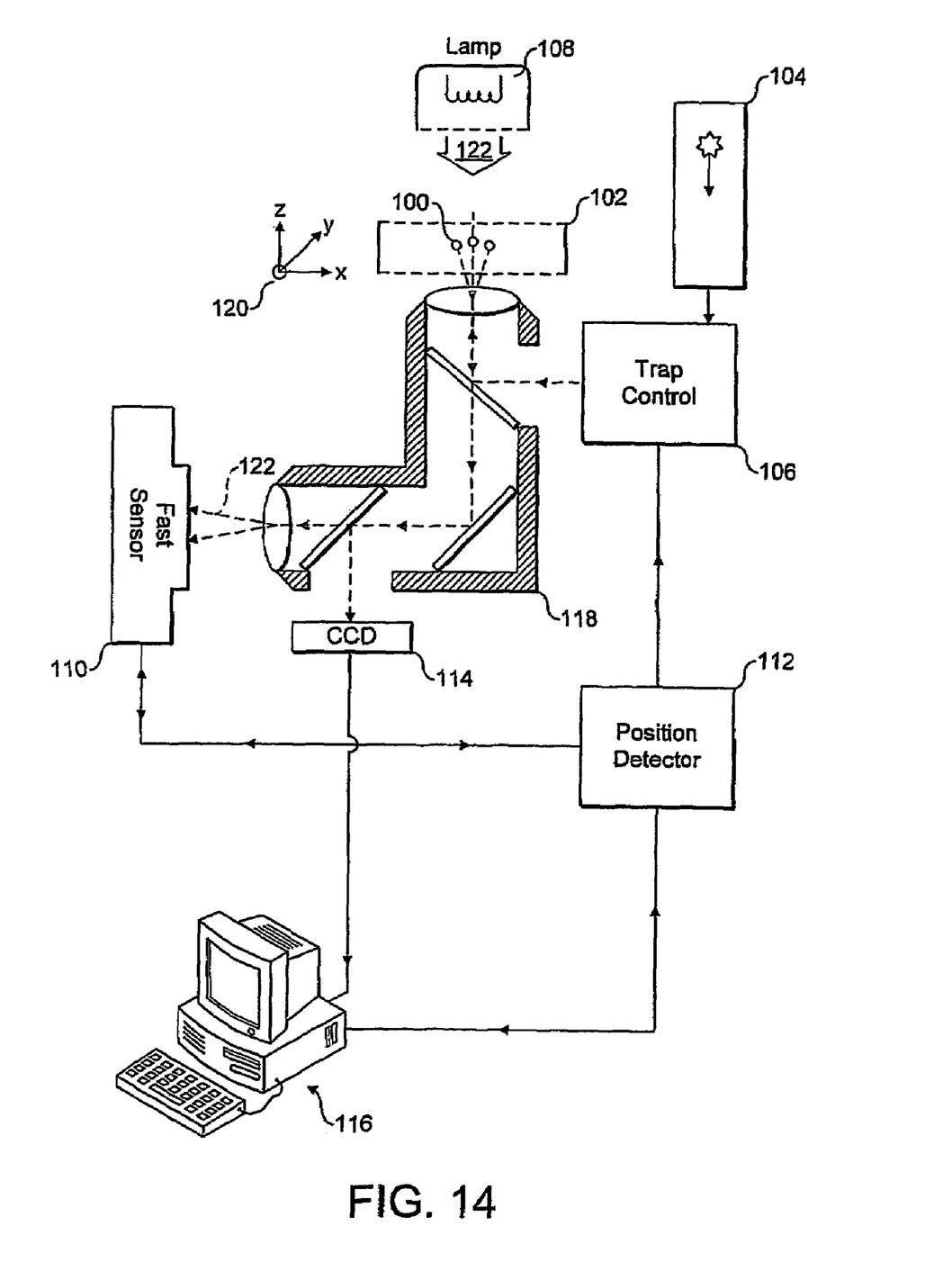
FIG. 14 shows, schematically, apparatus such as a microscope for using the probes illustrated in FIGS. 1 to 13 within a sample space.

One or more optically controllable devices, or probes as discussed above, may be used in apparatus as illustrated schematically in FIG. 14. The apparatus may be generally described as a microscope, although its primary purpose may vary, being applied, for example to manipulation, force measurement, and control on small scales.

One or more probes 100 are disposed in a sample space 102, typically fluid filled. A laser source 104 supplies a continuous laser beam to a trap control 106 which splits or multiplexes the beam to form a plurality of trap beams which are directed to the sample space 102. A lamp 108 or other light source illuminates the sample space 102 and the light passes to a fast sensor 110 where signals carrying information related to the positions of the probe vertices are detected. These signals are passed to a position detector element 112 which determines positions of the probes from the signals. The position detector may be implemented, for example, using a field programmable gate array as a digital signal processor. This position information is used by the trap control 106 to provide refined position control of the probes by adjusting characteristics and positions of the trap beams. Position information is passed back to the fast sensor 110 to enable the fast sensor to continue to track the probe vertex positions.

An image detector 114 may also be used to provide an image of the sample space 102 to a computer 116. The computer is also in communication with the position detector 112 and trap control 106 and is used to generally control the apparatus. The trap control, sample space, fast sensor and image detector communicate optically through optical assembly 118, which comprises suitable lens and mirror elements.

In use, trap control 106 is used to manipulate one or more of the probes 100 located in the sample space, to carry S out various manipulations and studies of sample elements within the sample space. The trapping beams preferably provide three dimensional control of each probe vertex, as illustrated by axes 120. Lamp 108, with suitable optics, provides a position sensor light beam 122 which is affected by the probes, for example by refraction by the transparent vertex beads, and the modified position sensor light beam is directed by optics assembly 118 onto the fast sensor 110. The fast sensor is typically a pixel array adapted to read out sensor data from controlled regions of interest at data rates much higher than could normally be achieved by reading the whole pixel array. A suitable fast sensor is described in UK patent application GB 0416498.4, the entire contents of which is hereby incorporated by reference.

In a typical configuration, fast sensor 110 is a 525×525 active pixel array, in which each pixel has a diameter of about 25 μm. Full frames can be read out at about 50 Hz, but the sensor can be configured to read out up to six smaller regions of interest (ROI), each with an area of up to 6×6 pixels, revisiting each ROI at up to 20 kHz. The ROIs can be of programmable shape and size, and can be reshaped and moved at a frequency of about 10 kHz. The ROI configurations can be changed much more quickly by flipping rapidly between alternate preprogrammed configurations.

Using such a sensor, probe position and orientation can be tracked quickly enough to adjust the trap characteristics and positions to compensate for Brownian motion. Moreover, forces at a tip of a probe can be measured to piconewton accuracy, and the position of a tip stably controlled and measured to nanometer accuracy. Changes in force at a tip can be measured at a rate of more than 20 kHz.

Figure 15A:
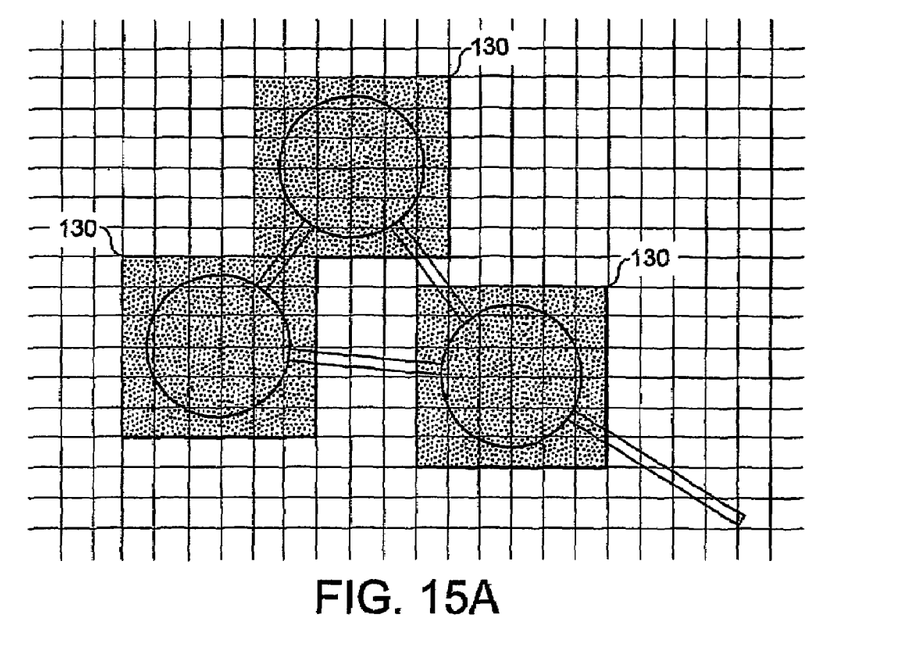
FIGS. 15A and 15B show pixel region configurations for the fast sensor of FIG. 14, to track x-y and z movement of trappable elements.

FIG. 15A illustrates a configuration of the fast sensor 110 optimized to detect variations in probe vertex position in the x-y plane corresponding to the plane of the fast sensor. The stippled three 6×6 pixel regions 130 each correspond to the approximate current position of one of the vertex beads, and lateral movement of the refraction pattern corresponding to each bead is easily detected.

Figure 15B:
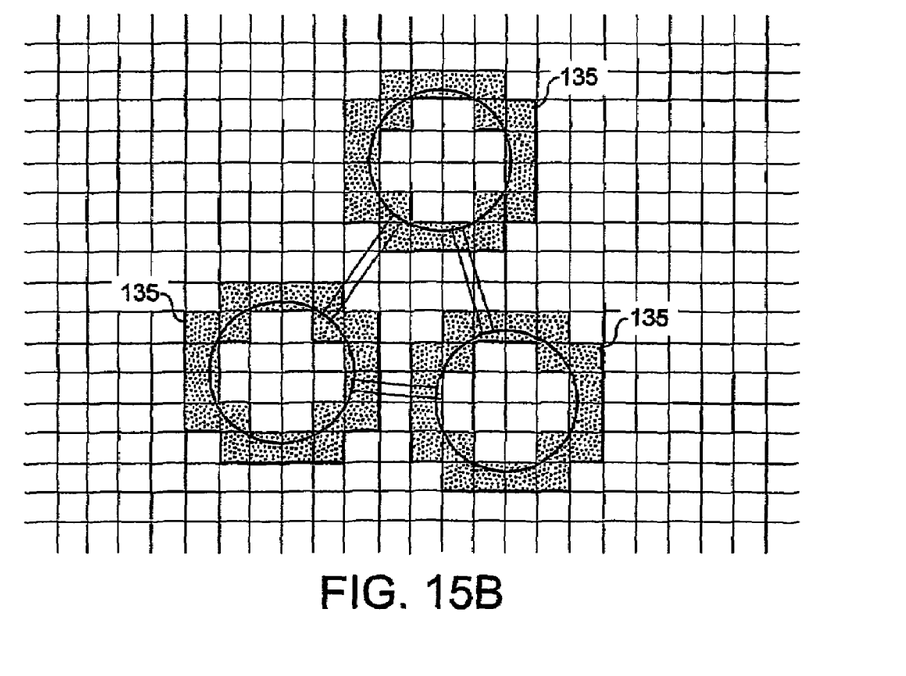

FIG. 15B illustrates a configuration of the fast sensor 110 optimized to detect variations in probe vertex position in the z plane corresponding to the plane perpendicular to the fast sensor. The stippled twenty pixel, regions 135 correspond approximately to the periphery of the. diffraction pattern generated by each vertex bead, and expansion or contraction of the refraction pattern into this periphery is easily measured.

Figure 16:
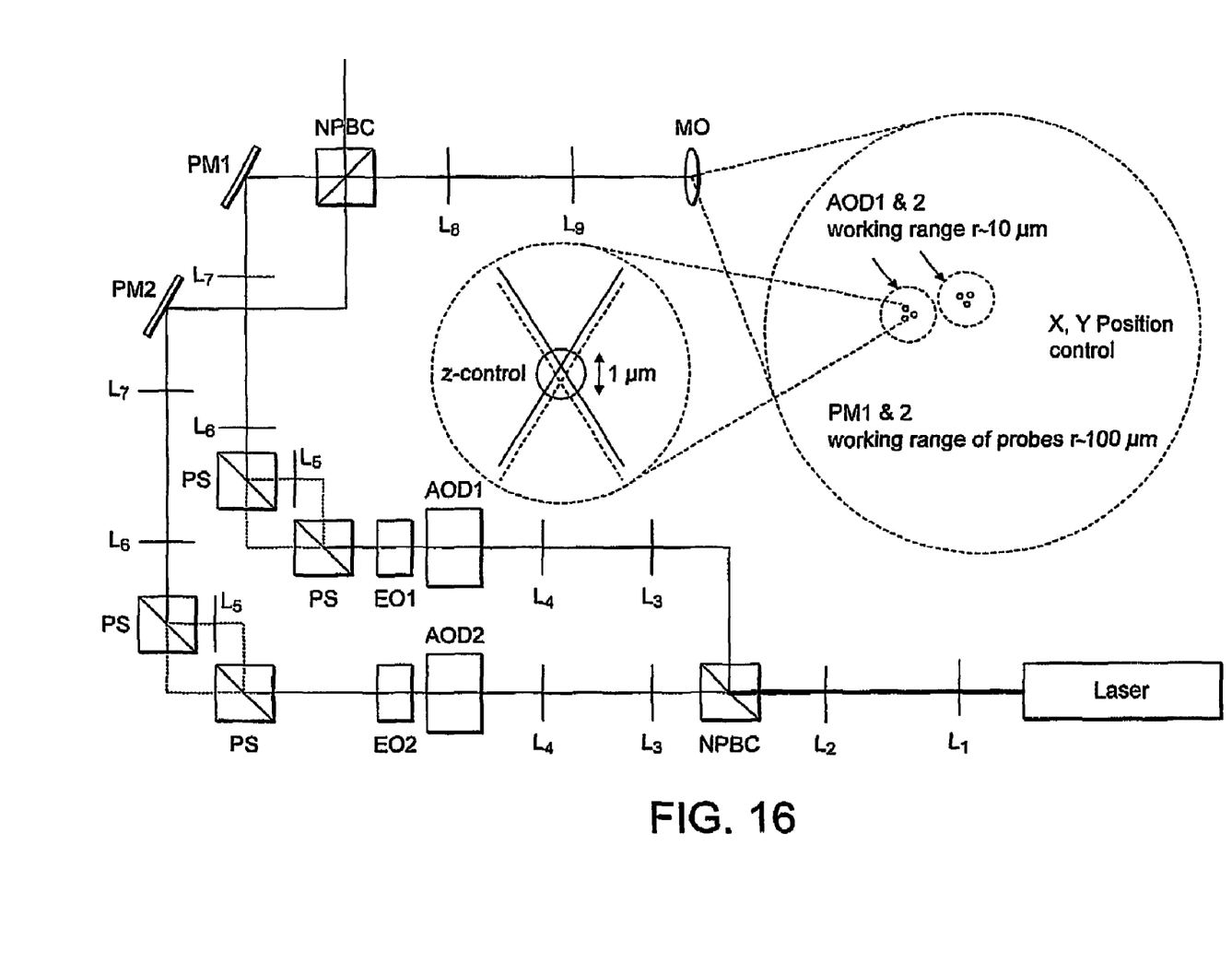
FIG. 16 is an optical schematic for the generation of optical traps in the apparatus of FIG. 14.

FIG. 16 illustrates, schematically, an optical configuration for forming the trapping beams and providing rapid x, y and z control based on feedback received from the fast sensor 110 and position detector 112. Lenses L1 to L9 create angular convergence of the trap beams onto the input aperture of the microscope objective MO. Acousto optic deflectors AOD1 and AOD2 are each used to switch the beam to create three traps within about 10 μm range at an update rate of 60 kHz and less than 20% dead time. Piezo tilt mirrors PM1 and PM2 provide a working range of about 100 μm for each group of traps. Electro-optic phase shifters EO1, EO2 split the beams after the AOD elements into two orthogonally polarised beams, and a small divergence is introduced by lens $L_5$ into one of the polarisations before the beams are re-collimated to create two focal spots displaced by about 1 μm in the z-direction. Z-axis control of the trap vertices is effected by adjusting the relative intensity of the two polarizations using the phase shifters.

Figure 17:
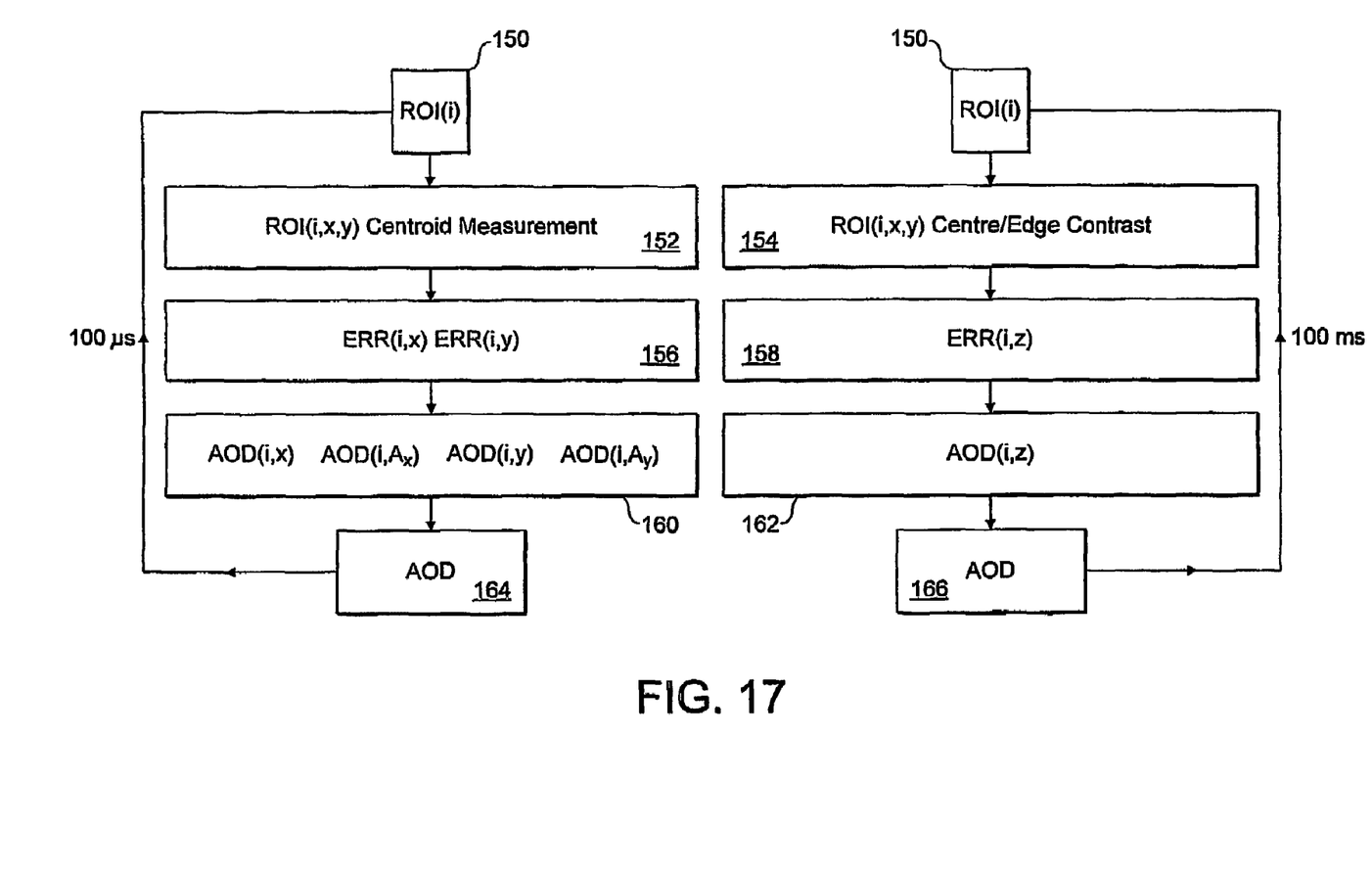
FIG. 17 illustrates a position feedback mechanism for the apparatus of FIG. 14.

FIG. 17 illustrates a feedback scheme for controlling each (i) of a plurality of optically trapped probe vertexes. The left side of the flow diagram depicts the feedback scheme in the x-y plane, and the right side depicts the scheme in the z-plane. In each case, the fast sensor 110 is used to measure pixel intensities in a defined region of interest, in step 150. The pixel intensities are used to determine a centroid in step 152 for the x-y process and a measure of centre/edge contrast in step 154 for the z process. In steps 156 and 158 error signals are determined by detecting the offset of the detected position from an intended position, and in steps 160 and 162 acousto optic deflector control signals are generated to compensate for the offsets. These control signals are passed to and utilized by the acousto optic deflectors in steps 164 and 166, and both the x-y and z error feedback processes are repeated with a frequency of about 10 kHz.

The error signals represent the differences between the determined positions of the probe vertexes and the corresponding trap positions, so may be used to provide measurement of other forces imparted on the vertexes or device, for example at the tip.

The microscope and probe arrangements set out above are intended to be illustrative of the invention, and not to limit the scope of the invention which is defined by the appended claims.

The invention claimed is:

1. An optically controllable device having a tip connected to a plurality of optically trappable elements, the optical trapping elements being spaced from the free end of the tip a distance greater than the effective range of the optical trapping fields.

2. The device as claimed in claim 1, wherein the tip is attached to at least three optically trappable elements arranged such that pairings of elements define at least three non-parallel axes.

3. The device as claimed in either claims 1 or 2, wherein the optically trappable elements have an average diameter of between 10 nm and 10 µm.

4. The device as claimed in any one of the preceding claims, wherein the tip has a length greater than 100 nm.

5. The device as claimed in claim 4 wherein the tip has a length in the range from 100 nm to 10 µm.

6. The device as claimed in claim 1, further comprising one or more force receiving surfaces for converting scattering forces imparted by incident radiation to motion of the device.

7. The device as claimed in claim 6, wherein the surfaces are disc-shaped.

8. The device as claimed in either claim 6 or 7, wherein the surfaces are reflective.

9. The device as claimed in any one of the preceding claims, wherein the tip is attached to at least one trappable element by a strand.

10. The device as claimed in claim 9, wherein at least one strand is elastic.

11. The device as claimed in any one of the preceding claims, wherein the tip and at least one trappable element have different optical properties.

12. The device as claimed in any one of the preceding claims, wherein the tip and at least one trappable element are of different materials.

13. The device as claimed in any one of the preceding claims, wherein the tip is metallic or metal-coated.

14. The device as claimed in any one of the preceding claims wherein the device is an optically controllable probe.

15. The device as claimed in any one of claims 1 to 13 wherein the device is an optically controllable guide.

16. The device as claimed in any one of the preceding claims, wherein the free end of the tip is spaced at least 1µm from the plurality of optically trappable elements.

17. A microscope comprising:
a trap control arranged to form a plurality of optical trapping fields in a sample space; and
one or more of the optically controllable devices of any preceding claim disposed in the sample space.

18. The microscope of claim 17 further comprising: an optical sensor arranged to output a signal dependent upon the positions of the optical trapping elements; and a position detector adapted to process the signal and provide position information to the trap control.

19. The microscope of claim 17 or 18 adapted to determine an external force on an optically controllable device by deviation of a position of the device from a control position.

20. The microscope of any of claims 17 to 19 wherein the or each tip is spaced from each connected trapping element by a distance greater than the 10% flux intensity distance of one of said optical trapping fields when centred on each trapping element.

21. Apparatus comprising:
one or more optically controllable probes disposed in a sample space, each probe having a tip connected to a plurality of optically trappable elements;
a trap control adapted to form a plurality of optical traps in the sample space to manipulate the probes;
an optical sensor arranged to output a signal varying with the positions of the optically trappable elements; and
a position detector adapted to process the signal and provide a position signal to the trap control.

22. The apparatus of claim 21 wherein the optical sensor is arranged to construct said signal from a plurality of discrete pixel regions, each pixel region corresponding to one of said optically trappable elements mapped onto said sensor.

23. The apparatus of claim 22 adapted to modify said pixel regions according to the positions of said optically trappable elements.

24. The apparatus of any of claims 21 to 23 adapted to determine a deviation of the position of the trappable elements from the expected position based on the configuration of the optical traps, to thereby measure an external force exerted on the probe.

25. The apparatus of any of claims 21 to 24 wherein the trap control and optical traps provide three dimensional manipulation of each trappable element.

26. The apparatus of any of claims 21 to 25 wherein the or each tip comprises an operative region spaced from the optically trappable elements so as to be outside the beams of the optical traps when in use.

27. The apparatus of claim 26 wherein the optical flux of the beams at the operative region is less than 10% of the average optical flux of each trapping beam at an optically trappable element.

28. A microscope comprising:
a trap control adapted to form a plurality of optical trapping fields in a sample space;
at least one optically controllable device, disposed in the sample space, the optically controllable device comprising a tip connected to a plurality of optically trappable elements spaced from the free end of the tip by a distance greater than the effective range of the optical trapping fields.

29. The microscope of claim 28 wherein each optically controllable device is free to move and rotate in three dimensions under the control of the optical trapping fields.

* * * * *